Patented Mar. 27, 1951

2,546,431

UNITED STATES PATENT OFFICE 2,546,431

PRODUCTION OF VINYL ALLYL ETHER

Georges Collardeau and Maurice Louis Auguste Fluchaire, Lyon, France, assignors to Societe des Usines Chimiques, Rhone-Poulenc, Paris, France, a French body corporate No Drawing. Application June 10, 1949, Serial No. 98,388. In France June 15, 1948

6 Claims. (Cl. 260—614)

This invention relates to the production of vinyl allyl ether.

It is stated in French Patent No. 724,955 that it is possible to obtain vinyl ethers by reacting acetylene with organic compounds containing hydroxyl groups at a temperature between about 80° C. and 250° C., and preferably between 120° C. and 180° C. It is made clear in the said patent specification that it is essential in the said process that the organic hydroxyl compounds should not contain any groups sensitive to the action of alkalis.

Thus, of the many examples given in the said specification the only unsaturated aliphatic compound employed is a higher alcohol in which the double bond is so remote from the hydroxyl group as to ensure its stability in a strongly alkaline medium. This specification, therefore, expressly excludes the possibility of directing vinylating unsaturated alcohols such as allyl alcohol and the homologues thereof since allyl alcohol is decomposed when heated with alkali at the temperatures recommended in the patent.

It has been found, however, that allyl alcohol, while being sensitive to the action of alkalis, may be converted to vinyl-allyl ether when reacted with acetylene by carrying out the reaction under special conditions. Thus, while allyl alcohol cannot be heated at a temperature higher than 100° C., in the presence of alkaline agents without being decomposed, it has been found that if the reaction is carried out in the presence of a substantial quantity of potassium allylate the reaction to form vinyl allyl ether can take place between 70° C. and 100° C. Under such temperature conditions the allyl alcohol is not sensitive to the action of the alkaline agent.

According to the present invention, therefore, a process for the production of vinyl allyl ether comprises reacting acetylene under pressure with allyl alcohol in the presence of a substantial quantity of potassium allylate, at a temperature between 70° C. and 100° C.

A preferred method consists in reacting acetylene under pressure with a solution of potassium allylate in allyl alcohol. Such a solution can be obtained, for example, by dehydrating a mixture of potassium hydroxide and allyl alcohol by azeotropic distillation with benzene.

The allylate preferably constitutes between 20% and 40% by weight of the reaction mass. With smaller quantities, the reaction is rather slow and with larger quantities the reaction mass tends to become too thick.

The reaction is preferably effected at a temperature between 75° C. and 90° C. If the temperature is higher, the yield is lowered by secondary reactions, and the ether obtained contains impurities which are difficult to separate by distillation.

The acetylene pressure may vary within wide limits. However, it is desirable to maintain it as high as is possible below the critical pressure at which there is risk of explosion. The reaction will take place at lower pressure but then proceeds more slowly. The preferred pressure range is 5 to 15 kg. per sq. cm.

The following example, in which the parts are by weight, will serve to illustrate the invention but is not to be regarded as limiting the invention in any way.

Example

Into an autoclave provided with means for stirring there is introduced a solution of 158 parts of potassium allylate in 277 parts of allyl alcohol. Acetylene is passed into the autoclave under a pressure of 16 kg. per sq. cm. and the temperature is raised to 90° C. The absorption of acetylene commences immediately and becomes progressively more rapid. After 1½ hours heating, the temperature is allowed to fall to 83° C., and is maintained at this level for 4 hours, by which time the absorption is practically complete. After cooling, 200 parts of water are introduced into the autoclave. Upon distillation of the product of the reaction, 371 parts of vinyl allyl ether distilling completely at 65° C. under a pressure of 740 mm. of mercury are obtained, i. e. a yield of 69% of that theoretically possible.

We claim:

1. A process for the production of vinyl allyl ether which comprises reacting acetylene under pressure with allyl alcohol and potassium allylate, the allylate constituting between 20 and 40% by weight of the combined weight of allyl alcohol and potassium allylate, at a temperature between 70° C. and 100° C. and continuing the reaction until absorption of acetylene has ceased.

2. A process for the production of vinyl allyl ether which comprises reacting acetylene under pressure with allyl alcohol and potassium allylate, the allylate constituting between 20 and 40% by weight of the combined weight of allyl alcohol and potassium allylate, at a temperature of 75° C. to 90° C. and continuing the reaction until absorption of acetylene has ceased.

3. A process for the production of vinyl allyl ether which comprises reacting acetylene under pressure with allyl alcohol and potassium allylate, the allylate constituting between 20 and 40% by weight of the combined weight of allyl alcohol and potassium allylate, at a temperature between 70° C. and 100° C., the acetylene pressure being as high as possible but below the critical pressure at which there is danger of explosion and continuing the reaction until absorption of acetylene has ceased.

4. A process for the production of vinyl allyl ether which comprises reacting acetylene under pressure with allyl alcohol and potassium allylate, the allylate constituting between 20 and 40% by weight of the combined weight of allyl alcohol and potassium allylate, at a temperature of 75° C. to 90° C., the acetylene pressure being as high as possible but below the critical pressure at which there is danger of explosion and continuing the reaction until absorption of acetylene has ceased.

5. A process for the production of vinyl allyl ether which comprises dehydrating a mixture of potassium hydroxide and allyl alcohol by azeotropic distillation in benzene to form a mass consisting of allyl alcohol and potassium allylate, the allylate constituting from 20 to 40% by weight of the mass, and treating the said mass with acetylene under pressure at a temperature between 70° C. and 100° C. and continuing the reaction until absorption of acetylene has ceased.

6. A process for the production of vinyl allyl ether which comprises dehydrating a mixture of potassium hydroxide and allyl alcohol by azeotropic distillation in benzene to form a mass consisting of allyl alcohol and potassium allylate, the allylate constituting from 20 to 40% by weight of the mass, and treating the said mass with acetylene under pressure at a temperature of 75° C. to 90° C. and continuing the reaction until absorption of acetylene has ceased.

GEORGES COLLARDEAU.
MAURICE LOUIS AUGUSTE FLUCHAIRE.

REFERENCES CITED

The following references are of record in the file of this patent:

UNITED STATES PATENTS

| Number | Name | Date |
|---|---|---|
| 1,959,927 | Reppe | May 22, 1934 |
| 2,021,869 | Reppe et al. | Nov. 19, 1935 |
| 2,066,076 | Reppe et al. | Dec. 29, 1936 |